(12) United States Patent  (10) Patent No.: US 6,212,045 B1
Guzik  (45) Date of Patent: Apr. 3, 2001

(54) METHOD AND APPARATUS FOR LOADING A MAGNETIC HEAD ONTO A MAGNETIC DISK

(75) Inventor: Nahum Guzik, Palo Alto, CA (US)

(73) Assignee: Guzik Technical Enterprises, San Jose, CA (US)

( * ) Notice: Subject to any disclaimer, the term of this patent is extended or adjusted under 35 U.S.C. 154(b) by 0 days.

(21) Appl. No.: 09/312,360

(22) Filed: May 14, 1999

(51) Int. Cl.$^7$ ...................................................... G01N 17/00
(52) U.S. Cl. ........................ 360/255.2; 73/865.6; 324/212
(58) Field of Search ............................. 360/254.3–254.6, 360/255.2–255.5; 73/865.6; 324/212

(56) References Cited

U.S. PATENT DOCUMENTS

| | | | |
|---|---|---|---|
| 4,005,485 | * 1/1977 | Opocensky | 360/75 |
| 4,811,144 | * 3/1989 | Miller et al. | 360/106 |
| 5,274,519 | * 12/1993 | Saito et al. | 360/105 |
| 5,590,095 | * 12/1996 | Chaya | 369/13 |
| 5,828,512 | * 10/1998 | Wada et al. | 360/75 |
| 6,006,614 | * 12/1999 | Guzik et al. | 73/865.6 |
| 6,094,047 | * 7/2000 | Guzik et al. | 324/262 |

\* cited by examiner

*Primary Examiner*—William Klimowicz
(74) *Attorney, Agent, or Firm*—McDermott Will & Emery (57) ABSTRACT

A spinstand head-loading mechanism of a magnetic tester includes a protector bar and a lift arm which control the loading and unloading operations of a magnetic head, as part of a head-gimbal assembly, with respect to a magnetic disk. A series of actuators control the engagement and disengagement of protector bar and lift arm with a head-gimbal assembly that includes read/write elements as part of a slider. The protector bar is driven in a Y-axis direction by an actuator, while the head-gimbal assembly is disposed in an X-axis direction, orthogonally to the Y-axis. The lift arm is also driven in the Y-axis direction by an actuator, but is also driven in a Z-axis direction by a different actuator. Before testing, the head of the head-gimbal assembly is loaded onto a magnetic disk. To accomplish this, the head-gimbal assembly is initially installed on the head-loading mechanism. During this process and when the head-gimbal assembly is outside of the magnetic disk area, the protector bar is used to support a suspension member of the head-gimbal assembly. To prevent damage to the head-gimbal assembly, the protector bar is formed from a plastic material having a low coefficient of friction. Ultimately, the lift arm takes over control of the head-gimbal assembly and the protector bar disengages the suspension member. The lift arm then lowers the head toward the disk until its "flying height" is established. Then the lift arm retracts. The head is unloaded by reversing these steps.

6 Claims, 8 Drawing Sheets

DIRECTION OF ROTATION

FIG. 7

STEP 1

FIG. 8A

STEP 2

FIG. 8B

STEP 3

FIG. 8C

STEP 4

FIG. 8D

STEP 5

FIG. 8E

STEP 6

FIG. 8F

STEP 7

FIG. 8G

STEP 8

METHOD AND APPARATUS FOR LOADING A MAGNETIC HEAD ONTO A MAGNETIC DISK

FIELD OF THE INVENTION

The present invention relates to magnetic head and disk testers, and in particular, to a method and apparatus for loading a magnetic head onto a magnetic disk accurately and smoothly, so as to avoid damage to the magnetic head and the magnetic disk during the loading operation.

BACKGROUND OF THE INVENTION

A magnetic head and disk tester is an instrument that is used for testing the characteristics of magnetic heads and disks. Tester parameters may include signal-to-noise ratio, bit error rate, and the like. A tester typically includes two main assemblies, an electro-mechanical assembly that performs movements of a head with respect to a disk, and an electronic assembly that is responsible for measurements, calculations, and analysis of the measured data. The electro-mechanical assembly of the tester is known as a spinstand. The spinstand generally simulates the motions of the head with respect to the disk that occur in, for example, a hard disk drive. The spinstand includes a support and rotational driver for the magnetic disk. The spinstand also includes an assembly of components which effects movement and placement of a magnetic head relative to the rotating, or spinning, magnetic disk, often referred to as a head-loading mechanism. Since the magnetic head and disk are very fragile by their nature, it is important that the magnetic head and disk never actually come into physical contact during operation. However, the magnetic head and disk are positioned in extremely close proximity to each other under such conditions to support magnetic read and write operations. Therefore, precise placement of the magnetic head relative to the magnetic disk is essential to avoid damaging contact between the two.

Figure 1:
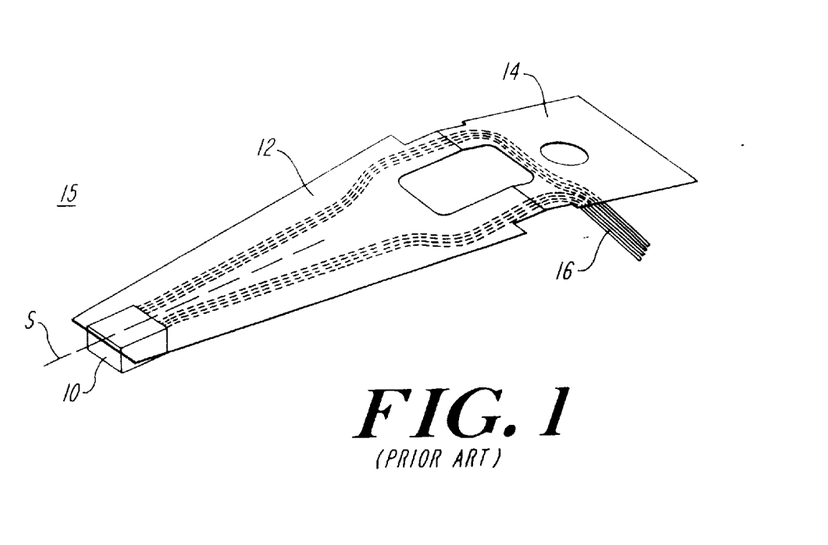
FIG. 1 is a schematic perspective view of a prior art head gimbal assembly.

In a typical spinstand configuration, the magnetic head is part of a head-gimbal assembly which disposes the magnetic head over the magnetic disk (but separated by aerodynamic forces) and is moved under the control of the head-loading mechanism. FIG. 1 shows a typical prior art head-gimbal assembly (HGA) 15, which includes a slider 10 disposed at a distal end of an elongated resilient suspension member 12 and a planar mounting portion 14 formed at its proximal end. Generally the suspension member 12 extends along a suspension axis S. The suspension axis S is angularly offset with respect to the planar portion 14. Slider 10 includes the magnetic head read and write elements of head-gimbal assembly 15. Disposed along the underside of suspension member 12, typically, are electrical wires 16 which carry read and write data signals to and from the magnetic head. In operation, the head-gimbal assembly 15 is secured to a cartridge, which in turn is secured to and manipulated by head-loading mechanism components to accomplish loading of the magnetic head over/onto the spinning magnetic disk.

To effect loading, the head-loading mechanism advances the slider toward a magnetic medium-bearing surface of the spinning disk. The resilience characteristic of the suspension is selected so that the slider is spring-biased toward the disk but kept separated form that disk due to air flow between the head and the spinning disk. The separation between the head and disk surface is referred to in art as the "flying height".

Thus, for the configuration of FIG. 1, suspension member 12 biases slider 10 toward the magnetic disk. When slider 10 is positioned near the spinning magnetic disk, an "air bearing" is formed between the slider 10 and the magnetic disk, and aerodynamic forces on the slider 10 counter the bias of the suspension member 12, causing the slider 10 to remain suspended just above the rotating magnetic disk, separated by a predetermined small gap (or "flying height") between slider 10 and the disk surface. The actual positioning of slider 10 relative to the magnetic disk, and the associated manipulation of the suspension member 12 are accomplished by various components of the head-loading mechanism. For example, in various prior art embodiments, arms or bars are used to control the suspension member 12 as the slider 10 is positioned near, or loaded onto, the disk.

In a typical prior art head-loading mechanism, the mounting portion 14 of head-gimbal assembly 15 is secured to a flat surface of a rigid block, known as a cartridge. The cartridge (with the head-gimbal assembly attached) is first affixed to a mating surface of the head-loading mechanism, for example using a pneumatic coupling. As part of the loading operation, the head-loading mechanism is then moved close to a magnetic disk and the slider 10 (and its read and write elements) is positioned over the disk such that the slider remains close to the disk, but is not brought into close proximity with the disk surface at this point. The disk may or may not be spinning during this part of the loading operation, depending on the particular design and configuration of the head and disk. The subsequent loading and testing operations depend on the type of head-loading mechanism incorporated by the spinstand of the tester. Those loading and test operations generally include lowering the head toward the disk to establish the suspension-air bearing force balance (i.e. the "loading") followed by moving the head through a series of predetermined test positions relative to the disk and reading and writing data (i.e. the "testing").

Figure 2:
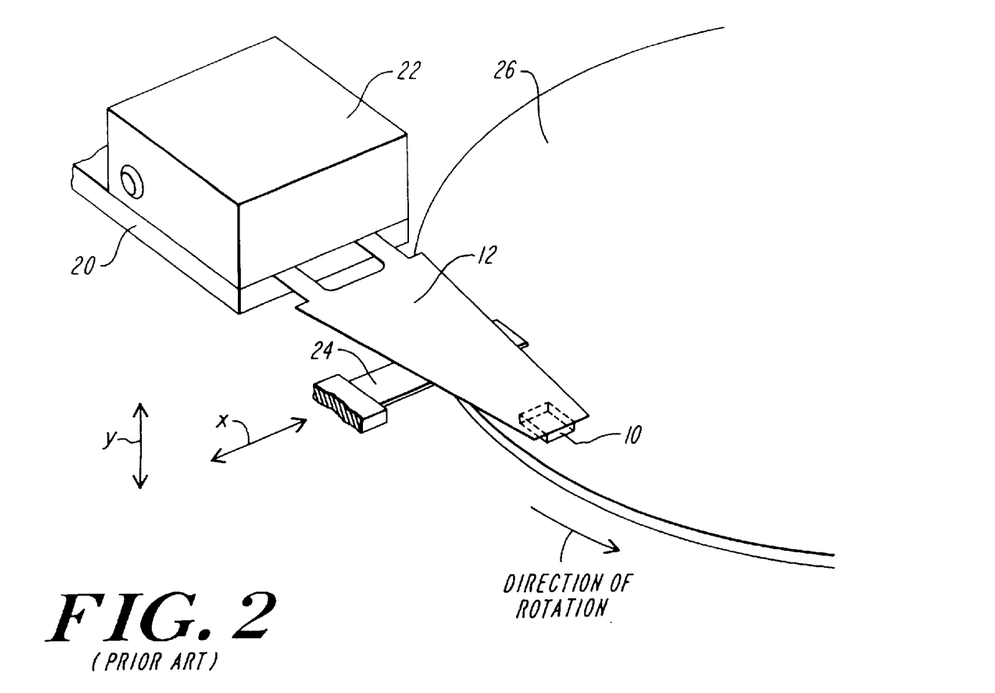
FIG. 2 is a schematic perspective view of a portion of a prior art spinstand head-loading mechanism incorporating a lift arm and the head-gimbal assembly of FIG. 1.

A portion of a prior art spinstand head-loading mechanism 20 is shown FIG. 2 as an example of such mechanisms. A head-gimbal assembly of the type shown in FIG. 1, and a cartridge 22 are mounted on a mating surface of the head loading mechanism 20 of the spinstand so that the slider 10 is opposite but grossly spaced apart, from the upper surface of spinning magnetic disk 26. The suspension member 12 is angled downward toward disk 26, with electrical wires 16 disposed on the underside of suspension member 12. The mounting portion 14 of the suspension member 12 is secured to the cartridge 22 which is secured in turn to head loading mechanism 20. In this exemplary prior art configuration, a metal arm 24 is disposed under the suspension member 12 such that its upper surface engages the underside of suspension member 12 between the slider 10 and portion 14, ensuring that slider 10 is significantly separated from disk 26. Arm 24 is movable in the X and Y directions, as illustrated in FIG. 2. In operation after the disk 26 is spinning, and with arm 24 in its extended position so that it underlies the suspension member 12, and with slider 10 positioned over disk 26 (all as shown in FIG. 2), arm 24 is lowered until slider 10 approaches its flying height and suspension member 12 separates from arm 24. Then arm 24 is retracted and testing begins. This prior art configuration has several significant problems. First during the loading operation, slider 10 moves on an arc and therefore the motion can be controlled more accurately and smoothly if arm 24 contacts suspension member 12 at a point close to slider 10. However, that is problematic because since suspension 12 is originally at an angle to mounting portion 14 of the head, arm 24 can not be positioned very close to slider 10, as this would cause arm 24 to contact and damage slider 10 as cartridge 22 (with the attached head-gimbal assembly)

is installed on head loading mechanism 20. During installation of cartridge 22 on head loading unit 20, arm 24 remains in its position and therefore lifts suspension element 12 as cartridge 22 makes firm contact with head loading mechanism 20. Again, because suspension 12 is originally at an angle to mounting portion 14 of the head-gimbal assembly, and arm 24 is made of metal, this operation typically causes arm 24 to scratch the side of suspension 12 where it contacts arm 24. In some types of heads, this results in damage to electrical wires 16 underneath suspension 12.

Figure 3:
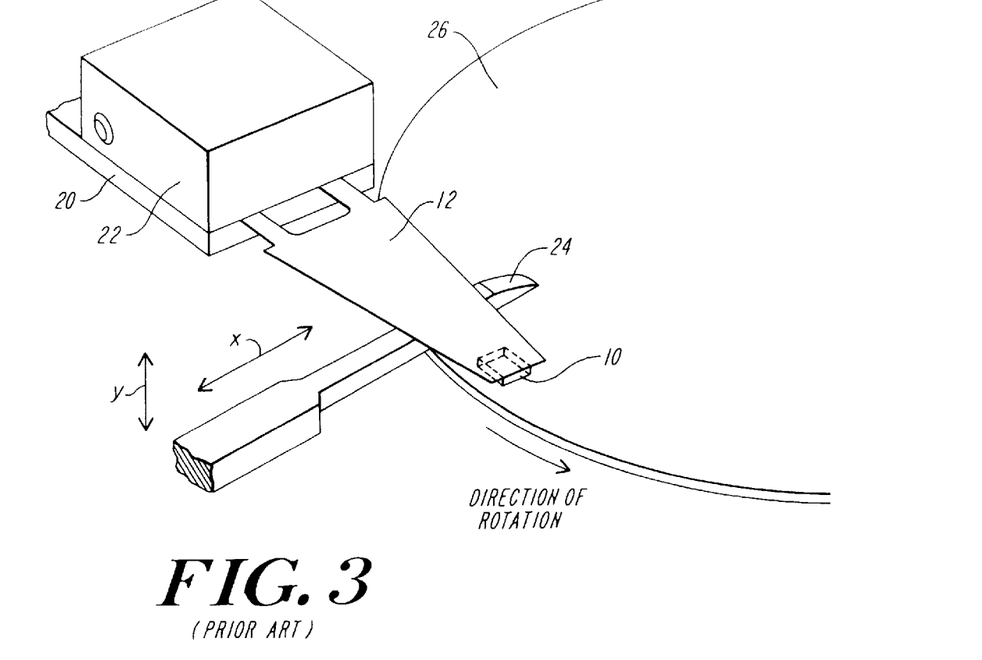
FIG. 3 is a schematic perspective view of a portion of a prior art spinstand head-loading mechanism incorporating a wedge shaped lift arm and the head-gimbal assembly of FIG. 1.

Another form of prior art spinstand head-loading mechanism is shown in FIG. 3. In that configuration, a head cartridge is initially mounted to head loading mechanism 20. In this configuration, lift bar 24 (which has an inclined profile wedge at its distal end, and which is retractable in the X-direction) is positioned between slider 10 and the top surface of disk surface 26, where the thickness of the tapered tip of the wedge is less than the gap between suspension member 12 and disk surface 26 when the head is loaded on the disk. As a wedge is inserted between suspension member 12 and the disk 26, the slider 10 is lifted off of the disk 26, and as lift bar 24 is pulled away, slider 10 moves bar 24 closer to the disk, until it starts flying over surface of disk 26. There is a gap between bar 24 and disk surface 26 at all times in order to avoid contact between the two. Due to the high precision and small dimensions (especially thickness) of bar 24, it can not be manufactured of a plastic material. During installation of a cartridge 22 (with the attached head-gimbal assembly) on head loading mechanism 20, the wedge portion of arm 24 remains in its position and therefore lifts suspension member 12 as cartridge 22 makes firm contact with the mounting surface on head loading mechanism 20. Because suspension member 12 is originally at an angle to mounting portion 14 of the head-gimbal assembly, this operation can cause arm 24 to scratch the side of suspension member 12 where it contacts arm 24. In some types of heads, this results in damage to electrical wires 16 underneath suspension 12.

Figure 4:
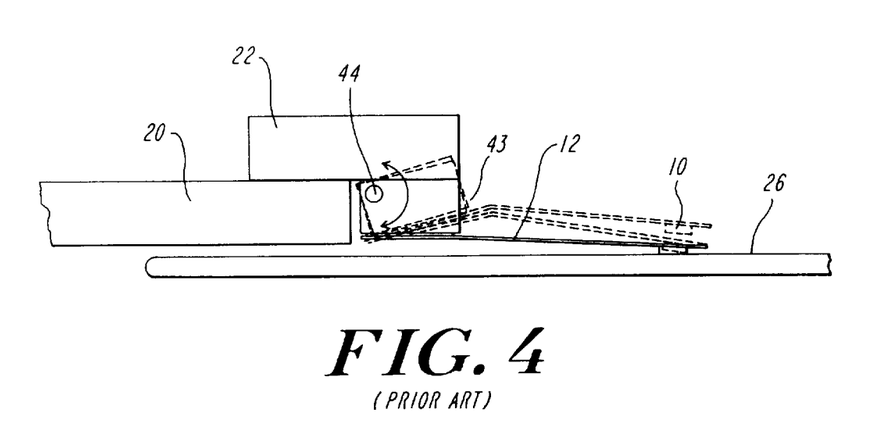
FIG. 4 is a schematic side view of a portion of a prior art spinstand head-loading mechanism capable of rotating the head-gimbal assembly of FIG. 1.

Another prior art head loading assembly is shown in FIG. 4. That assembly addresses the potential for damage to electrical wires 16 of the head-gimbal assembly. In that prior art assembly, load and unload operations are achieved by rotating a mounting block 43 (together with the head-gimbal assembly) with respect to cartridge 22, about an axis 44 parallel to the top surface of disk 26. There are no bars or wedges that contact the suspension during these operations. During loading operation, the head loading mechanism 20 is brought close to the disk 26 such that the slider, 10 remains over the disk, and mounting block 43 together with the head-gimbal assembly, is rotated until mounting portion 14 is parallel to the disk 26, at a specified distance from the surface of disk 26. During this rotation, due to the initial angle between suspension member 12 and mounting portion 14 of the head-gimbal assembly, slider 10 contacts the disk before mounting portion 14 becomes parallel to the disk 26, and therefore may cause scratches and pits on disk surface 26 an slider 10. During unloading operation, mounting block 43 is rotated in the opposite direction compared to the loading operation. As slider 10 is lifted off of the disk 26, suspension member 12 can vibrate vertically since it is not supported at a point close to slider 10. This may cause scratches and pits on surface 26 and slider 10.

Figure 5:
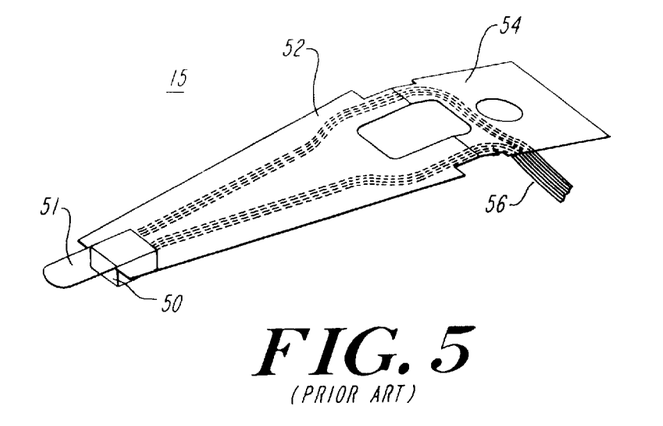
FIG. 5 is a perspective view of a head-gimbal assembly incorporating a lifting tab.

In order to overcome some of the problems associated with the above described prior art head loading assemblies, more recent prior art suspension members are provided with a lifting tab at the distal end that extends beyond the slider. An exemplary prior art head-gimbal assembly 60 of this form including a lift tab 51, is shown in FIG. 5. In FIG. 5, elements that correspond to elements in the assembly of FIG. 1, are identified with the same reference designations. In this form, the lifting tab 51 is used by the a head-loading mechanism of a spinstand to lower and lift suspension member 12 and, therefore, slider 10, during the loading and unloading operations. Lift tab 51 is typically located beyond slider 50, as an extension of the suspension member 12, but very close to slider 50. Like the head-gimbal assembly 15 of FIG. 1, the head-gimbal assembly 15 of FIG. 5 also includes electrical wires 16 disposed at the underside of the suspension member 12.

Figure 6:
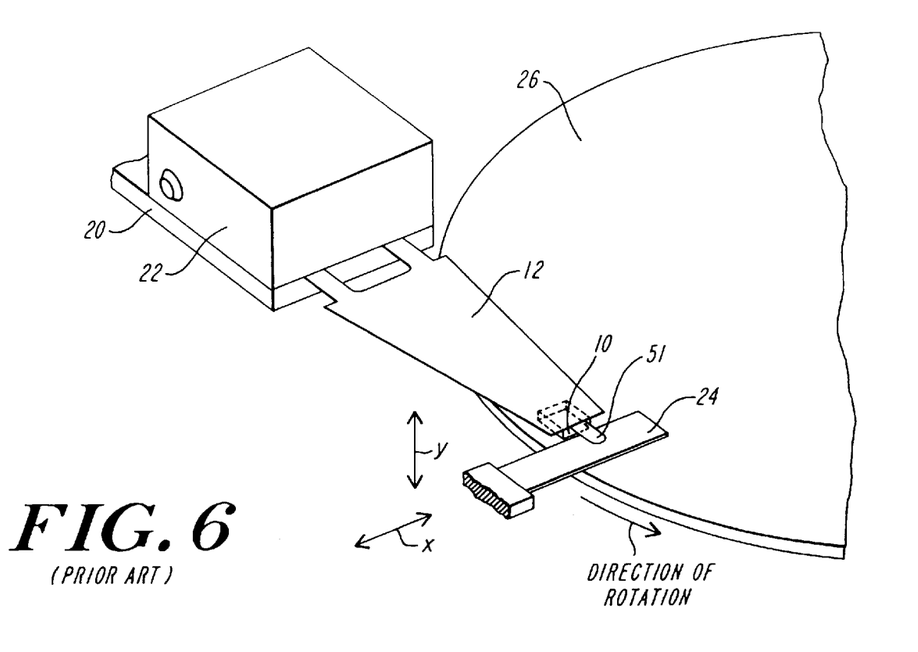
FIG. 6 is a schematic side view of a portion of a prior art spinstand head-loading mechanism incorporating a lift arm and the head-gimbal assembly of FIG. 5.

An example of a portion of a prior art head-loading mechanism of a spinstand incorporating head-gimbal assembly 15 of FIG. 5 is shown in FIG. 6. In FIG. 6, the arm 24 is laterally displaced (compared with the location of the corresponding arm in FIG. 2). Mounting portion 14 of the suspension member 12 is secured to cartridge 22, which in turn is secured to head-loading mechanism 20. Again, suspension member 12 is biased toward a magnetic disk 26 mounted on the spinstand. Suspension member 12 is engaged by arm 24 at tab 51 and its motion (and slider 10) relative to disk 26 is controlled by the vertical (Y) direction arm 24. In such a spinstand, the problem of damaging electrical wires 16 is eliminated, since arm 24 does not physically interact with the underside of head-gimbal assembly 15 in the area of electrical wires 16. However, this form of head loader has a different problem. That is, as cartridge 22 and head-gimbal assembly 60 are installed on the head loading mechanism 20, due to the initial angular orientation of suspension member 12, toward disk 26, the tab is relatively close to disk 26. As a consequence, that lifting arm 24 may not reliably engage lift tab 51.

For a particular type of head gimbal assembly, one of the above mentioned prior art head loading mechanisms may work better than another, but for certain types of heads each of them has one or more deficiencies, as described above. In older head and disk designs, the scratches and pits on the disk surface caused by the loading and unloading operations of such spinstands were within acceptable limits. However, as the head and disk technology progresses, there is an increasing need for higher precision and integrity of the head and disk components. Moreover, for certain types of head design, no prior art system is adequate.

Accordingly, it is an object of the invention to provide a head loading apparatus and method that minimizes damage to heads and disks during loading.

It is another object to provide a head loading apparatus and method that permits improved, minimal damaging loading without requiring special handling.

SUMMARY OF THE INVENTION

The present invention provides a head-loading mechanism of a magnetic tester that provides for smooth loading and unloading of a magnetic head onto a spinning magnetic disk of a spinstand, without damage to the head of a head-gimbal assembly, the magnetic disk, or other portions of the head-gimbal assembly, such as electrical wires. The head-gimbal assembly includes an elongated resilient suspension member having a mounting portion at one end and a slider, which includes the head read and write components, at the other end, and may include electrical wires disposed on its underside. A cartridge is affixed to the mounting portion, to form a single unit that can be tested. The unit, including a cartridge and an attached head-gimbal assembly, is referenced to herein as a cartridge/HGA assembly. The cartridge/HGA assembly is mounted to the head loading mechanism so that the long axis of the suspension member extends at least in part along an X axis parallel to the plane of the disk, and in part angled toward the plane of the disk.

The preferred head-loading mechanism includes two head control mechanisms which support and control the slider and suspension member during loading and unloading operations. The first head control mechanism includes a protector bar which is secured to a first carriage that is slidably coupled to a first rail which is integral with a base plate, wherein the base plate provides the overall foundation of the head-loading mechanism. An actuator drives the protector bar along a Y-axis (orthogonal to the X-axis) via a shaft. The protector bar provides initial support for the suspension member, from underneath, as the cartridge together with the head-gimbal assembly is being secured to the head loading mechanism. The protector bar is formed from a material having a low coefficient of friction, to prevent damage to the head-gimbal assembly, including, but not limited to the electrical wires at the underside of the suspension member.

The second head control mechanism includes a lift arm which engages the suspension member of the head-gimbal assembly and ultimately takes over control after the head-gimbal assembly has been secured to the head-loading mechanism. The lift arm is secured to a second carriage which is slidably coupled to a second rail that is integral with the base plate. A second actuator drives the lift arm in the Y-axis direction, parallel to the protector bar. The second carriage includes a third carriage to which the lift arm is directly coupled. The third carriage is driven by a third actuator to move the lift arm in a Z-axis direction, which is orthogonal to the X and Y-axes. The lift arm is first disposed beneath the suspension member and then moves away from the disk in the Z-axis direction to engage the suspension member and disengage the protector bar. The lift arm ultimately lowers the slider until it rests on the air bearing formed between the slider and the disk and then disengages the suspension member and retracts. The unloading operation is performed by reversing these steps.

In a preferred form, the invention loads a slider of a cartridge/HGA assembly against a surface of a rotating magnetic disk, where the cartridge/HGA assembly includes (a) a cartridge having a suspension support surface on one side thereof, (b) a head-gimbal assembly including (i) an elongated, resilient suspension member extending along a suspension axis from a proximal end to a distal end, where a first side of the suspension member at said proximal end is affixed to the suspension support surface of the cartridge, and (ii) a slider including the read and write elements of the magnetic head. The slider is affixed to a second side of the suspension member at a point along the suspension axis between the distal end and the proximal end. This form of the invention includes a spindle and associated disk support assembly attached to a base on a spinstand. The spindle and support assembly support the disk in a circular locus in a disk plane, and rotate the disk in the disk locus about a spin axis perpendicular to the disk plane. A head loader assembly on the base includes a head support assembly, a lift arm, a protector bar and a driver/controller. The head loader assembly is slidable in a predetermined range of motion along a slide axis parallel to the disk plane. The head support assembly rigidly supports the cartridge (with the attached head-gimbal assembly) mounted thereon, whereby (1) the read write elements of the magnetic head are opposite the disk plane and at least in part of its range of motion, are opposite the disk locus, and (2) the suspension axis of the resilient suspension member is in a suspension plane perpendicular to the slide axis (i.e. a plane passing through the axis of suspension member, as that member).

The lift arm is in a first locus, at least in part extending in a direction parallel to the slide axis and extending through the suspension plane. The lift arm is selectively moveable in the direction of the slide axis and in a direction of a lift axis perpendicular to the disk plane. The first locus is between the cartridge and the distal end of the suspension member of the head-gimbal assembly when those elements are mounted to the head support assembly.

The protector bar is in a second locus, at least in part extending in a direction parallel to the slide axis and extending through the suspension plane. The protector arm is selectively movable in the direction of the slide axis, and has an upper surface made of a material with a relatively low coefficient of friction. That surface is located with respect to the portion of the head support assembly which supports the cartridge to ensure that the suspension member is deflected upward (from its nominally downward angled inclination) when the cartridge is mounted to the head support assembly with the protector bar is in the suspension plane and the lift arm is not in that plane. The second locus is between the first locus and the distal end of the suspension member when the cartridge and head-gimbal assembly are mounted to the head support assembly.

In the preferred form, the driver/controller is operative prior to mounting of the cartridge and head-gimbal assembly to the support plate, to position the protector arm to extend through the suspension plane, and to position the lift arm outside that plane. Upon mounting the cartridge to the head support assembly, the suspension member is biased against the top surface of the protector bar. The driver/controller is operative following mounting of the cartridge to the head support assembly, to successively:

(a) drive the lift arm in the direction of the slide axis to a position underlying the suspension member, (b) drive the lift arm in the direction of the lift axis until the lift arm engages the suspension member and lifts the suspension member from the top surface of the protector bar, (c) drive the protector bar in the direction of the slide axis so that the protector bar does not extend through the suspension plane, (d) position the head loading mechanism whereby the read and write elements of the magnetic head of the head-gimbal assembly overlie the disk locus, (e) drive the lift arm in the direction of the lift axis and toward the disk locus, until the suspension member disengages from the lift arm, (f) drive the lift arm in the direction of the slide axis so that the lift arm does not overlie the disk locus.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used substantially unchanged in more than one figure, it is identified by the same alphanumeric reference indicator in all figures.

DETAILED DESCRIPTION OF THE PREFERRED EMBODIMENTS

Figure 7:
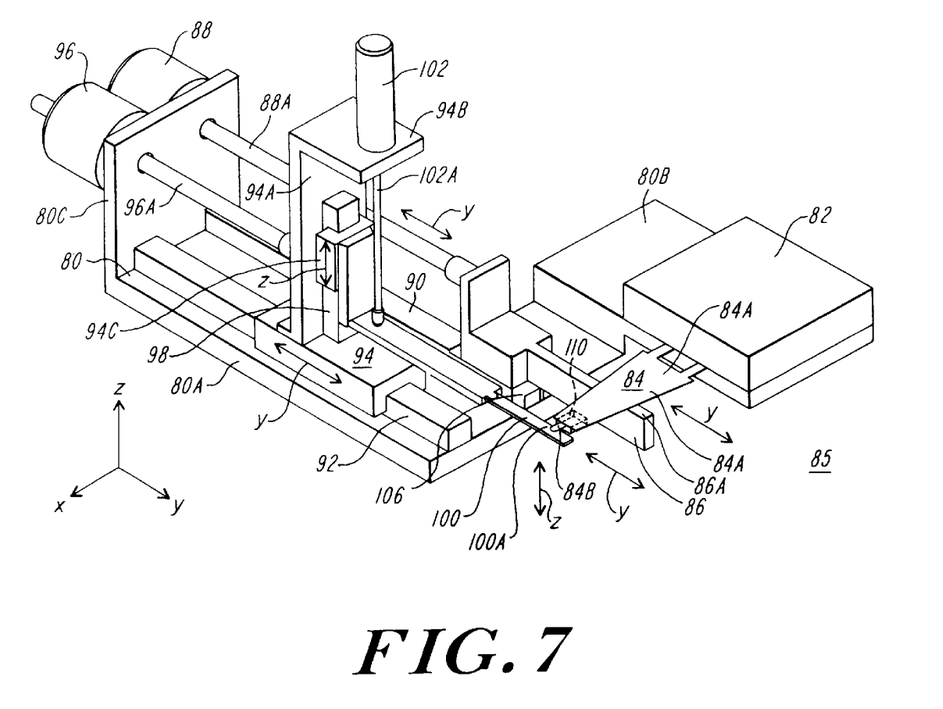
FIG. 7 is a schematic perspective view of the preferred embodiment of a head-loading mechanism in accordance with the invention.

A preferred embodiment of a head-loading mechanism 85 of the invention shown (with respect to an X-Y-Z cartesian coordinate system) in FIG. 7 for a spinstand magnetic head and disk tester. The preferred embodiment is adapted for a head-gimbal assembly 84 which is substantially similar to that described with respect to FIG. 5, including resilient elongated suspension member 84A, a mounting portion, a slider 110, and a lifting tab 84B. The head-gimbal assembly has its mounting portion affixed to a rigid cartridge 82, so that the head-gimbal assembly 84 and cartridge 82 form a single unit for testing. Other forms of cartridge and head-gimbal assemblies may be used as well.

In FIG. 7, a base plate 80 provides a rigid foundation for head-loading mechanism 85 which is mounted to a spinstand (not shown) having a support for a magnetic disk, and rotational driver for that disk. The plate 80 comprises three plate components 80A, 80B, and 80C. Plate component 80A serves as the foundation for a series of head control mechanisms which selectively manipulate a cartridge (with an attached head-gimbal assembly) to be mounted thereto. The main portion of plate component 80A extends in the direction of the Y-axis. A rectangular head-gimbal support plate component 80B extends from component plate 80A. An upper portion of plate component 80B is adapted to receive cartridge 82 and the head-gimbal assembly in a conventional manner, with the mounting area of head-gimbal assembly 84 secured to cartridge 82, which in turn is secured to plate component 80B. In the illustrated embodiment, plate component 80B is oriented to offset cartridge 82 and head-gimbal assembly 84 to one side of and above the main portion of plate component 80A. When the cartridge is secured to plate component 80B, as shown in FIG. 7, the resilient elongated suspension member 84A of the secured head-gimbal assembly 84 extends principally in the direction of the X-axis, but also is angled downward. An actuator plate component 80C extends from component plate 80A in the direction of the Z-axis. Plate component 80C supports two actuators 88 and 96 which comprise portions of two head control mechanisms described below. Those head control mechanisms are adapted to engage the suspension member 84A of the head and gimbal assembly 84 to position a slider 110 in the Z axis direction relative to a magnetic disk (not shown).

The first head control mechanism includes an elongated protector bar 86 extending in the Y direction, for engaging the underside of suspension member 84A between slider 110 and cartridge 82, but proximate to slider 110. Protector bar 86 is movable in the Y-axis direction, and oriented orthogonally to the principal axis of suspension member 84A. A first rail 90 is integral with plate component 80A and oriented in the Y-axis direction. Protector bar 86 is secured to a first carriage 106, which is slidably coupled to rail 90. A first actuator 88 drives carriage 106 and bar 86 via drive shaft 88A which extends through an opening formed in actuator plate component 80C and, accordingly, causes movement of protector bar 86 in the Y-axis direction. The top surface 86A of the distal end of protector 86 is a predetermined distance, D1, from the cartridge support surface 80B of head loading mechanism 85. That distance D1 is sufficient to ensure that the suspension member 84A is deflected upward (from its nominally downward inclination) when the cartridge 82 is mounted to the support surface of plate 80B when the protector bar 86 extends through the suspension plane. In the preferred form, protector bar 86 is made from a plastic material with a low coefficient of friction, e.g. Delrin-AF, such that the bar 86 can not damage the electrical wires (not shown) at the underside of suspension member 84A. As will be appreciated by those skilled in the art, protector bar 86 serves a protection function similar to that of a typical plastic "comb" used for separating the heads of a head stack.

The second head control mechanism includes an elongated lift arm 100 for engaging lifting tab 84B of suspension member 84. Lift arm 100 is movable along two orthogonal axes. By way of example, the arm may be metal but relatively thin, for example, having a thickness of 0.004 inches. The second head control mechanism includes a second rail 92 integral with plate 80A and disposed in the Y-axis direction parallel to the first rail 90. A second carriage 94 is slidably coupled to rail 92 and moves in the Y-axis direction. A second actuator 96 drives the second carriage 94 back and forth on rail 92 via a second shaft 96A which extends parallel to the Y-axis through an opening formed in actuator plate 80C. The Y-direction range of motion of lift arm 100 (due to motion of carriage 94 on rail 82) permits lift arm 100 to be extended through the suspension plane in an "extended" position, and to be outside the suspension plane in a "retracted" position.

Carriage 94 also includes a first extension 94A, vertical to the Y-axis and in the direction of a Z-axis, from which there is a second extension 94B that overhangs rail 92 in the direction of the Y-axis. First extension 94A includes a third rail 98 extending in the Z-axis direction. A third carriage 94C is slidably coupled to rail 98. Carriage 94C supports lift arm 100 so that lift arm 100 extends in the direction of the Y-axis. A third actuator 102 drives carriage 94C via a third shaft 102A, which extends through an opening in second extension 94B. Actuator 102 causes controllable displacement of lift arm 100 (and its supporting carriage 94C) in the Z-axis direction. The Z-direction range of motion of lift arm 100 (due to motion imparted by actuator 102) permits lift arm 100 to move from points above the top surface 86A of protector bar 86 to points below the suspension member 84A when the cartridge 82 is mounted to the support surface of plate 80B.

For the embodiment of FIG. 7, FIGS. 8A–8H shown schematic cross sectional views in the suspension plane of portions of head-loading mechanism 85 and head-gimbal assembly 84 in a series of eight steps which comprise a head-loading operation. Before testing a head or disk on a magnetic head and disk tester, the slider 110 of head-gimbal assembly 84 must be "loaded on" a magnetic disk 104, i.e., positioned at a "flying height" distance from the disk which supports the reading and writing of data. In FIGS. 8A–8H, only the protector bar 86, suspension member 84A, lift tab 84B, mounting portion 84C, lift arm 100, disk 104, slider 110 and support plate 80B are shown.

Figures 8A, 8C:
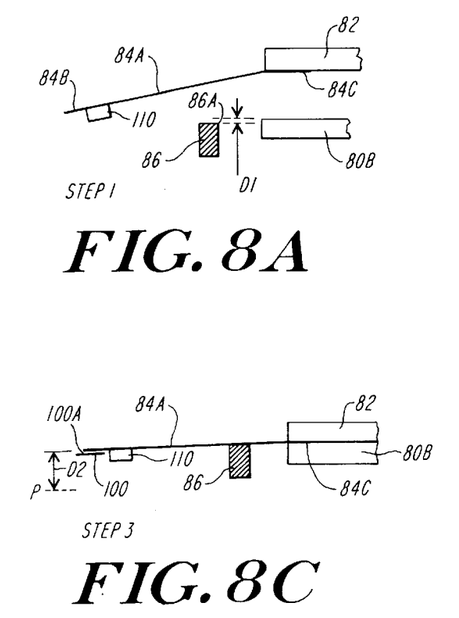
FIGS. 8A–8H show a series of schematic cross-sectional views depicting the steps of loading operation of the head-loading mechanism of FIG. 7.
Figures 8B, 8D:
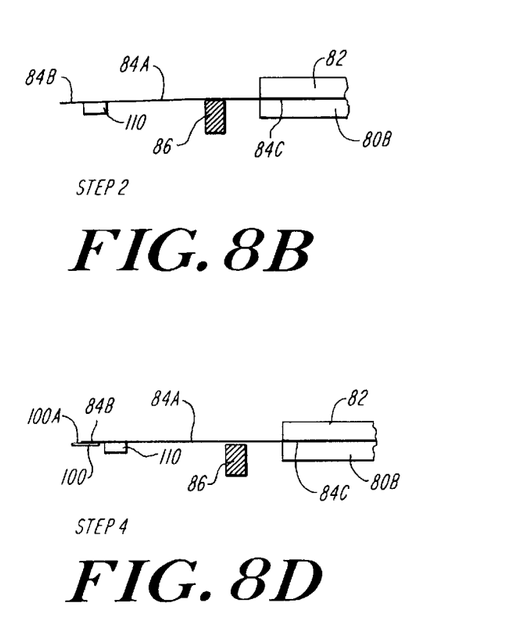
Figure 8E:
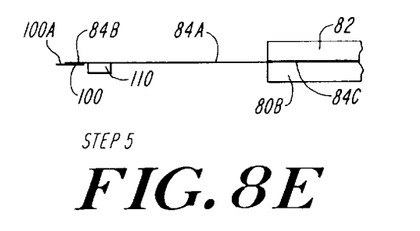
Figure 8F:
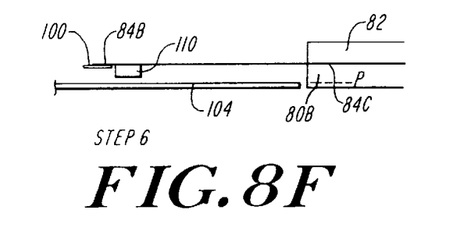
Figure 8G:
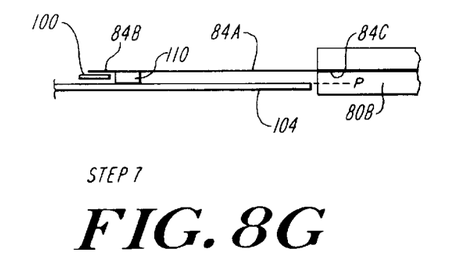
Figure 8H:
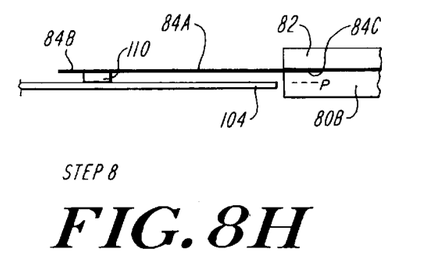
Figure 9:
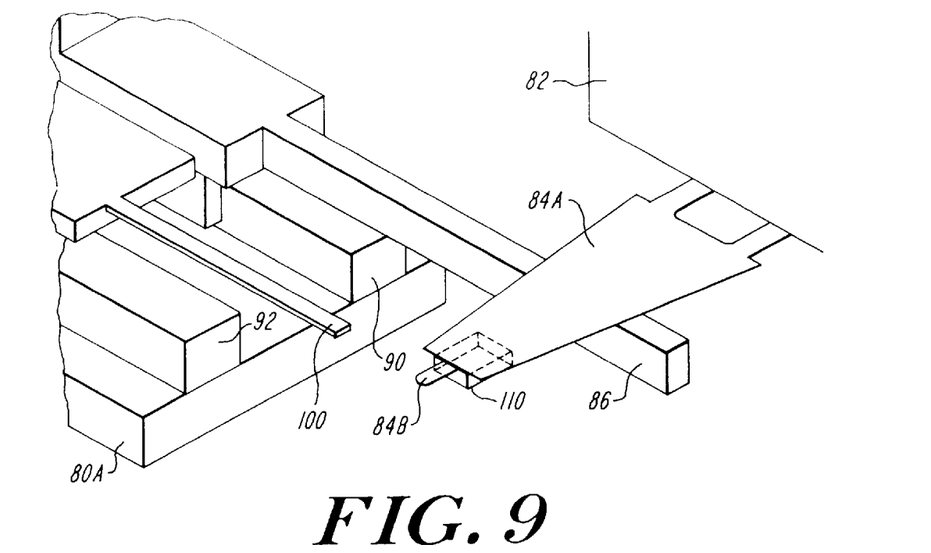
FIGS. 9, 10, 11, 12 and 13 are partial schematic perspective views of the head-loading mechanism of FIG. 7 which demonstrate the steps of the loading operation.

Initially, the lift arm 100 is in its retracted position. Step 1, FIG. 8A, depicts the start of the loading operation, wherein a head cartridge 82 and 84 (including cartridge/head-gimbal assembly 82/84(elements 84A, 84B, 84C and 110) is moved (e.g. an operator) toward and installed onto support plate 80B of the head loader 85. During this step, protector bar 86 is in an extended position such that bar 86 underlies the anticipated placement location for suspension member 84A of head gimbal assembly 84. During this installation of the cartridge 82, the top surface 86A of protector bar 86 interferes with the suspension member 84A causing it to resiliently deflect upward (relative to mounting portion 84C) as cartridge 82 approaches plate component 80B. Step 2, FIG. 8B and FIG. 9, shows the position of protector bar 86 and suspension member 84A after cartridge 82 is installed onto base plate component 80B. Since protector bar 86 is manufactured out of a plastic material with low coefficient of friction, any electrical wires underneath the suspension will not be damaged during this installation operation. Moreover, as shown in FIG. 8B, protector bar 86 establishes a position of lift tab 84B at a distance D2 from the plane P. The distance D2 is selected for the particular geometry of the cartridge 82 and attached head-gimbal assembly 84 to ensure that the slider 110 cannot physically contact disk 104, and also to ensure that the lift arm 100 can reliably engage lift tab 84B.

Figure 10:
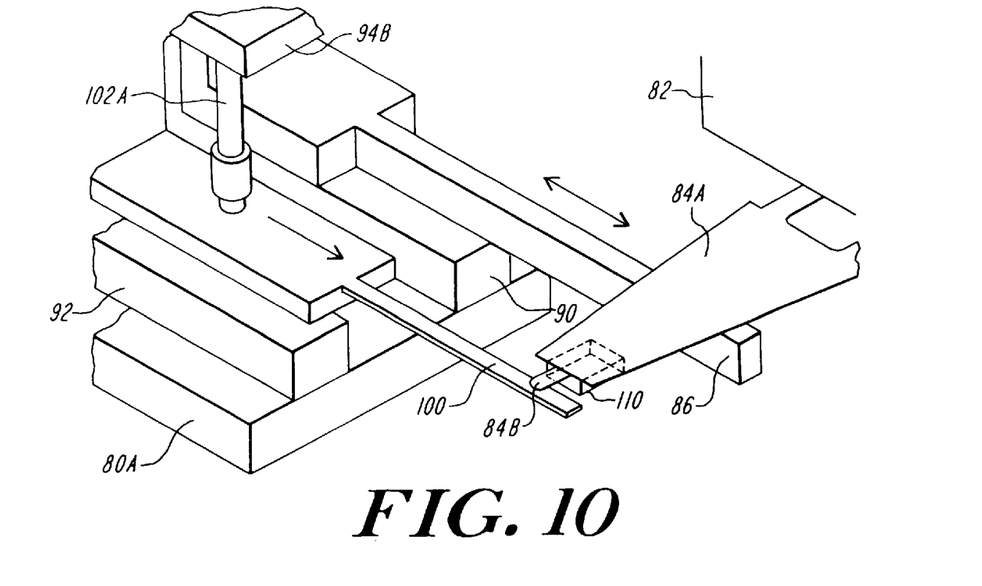
Figure 11:
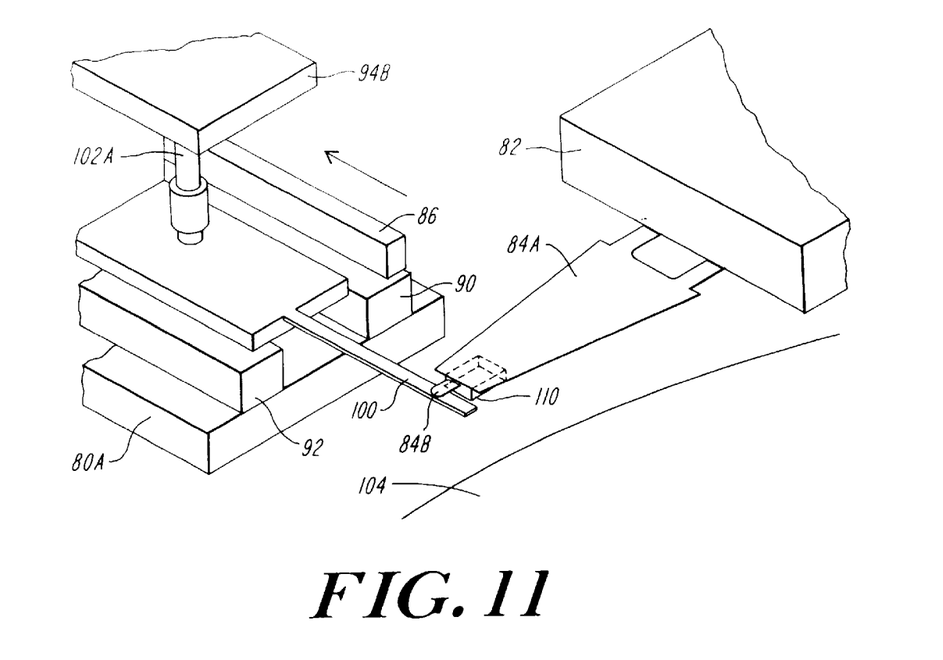
Figure 12:
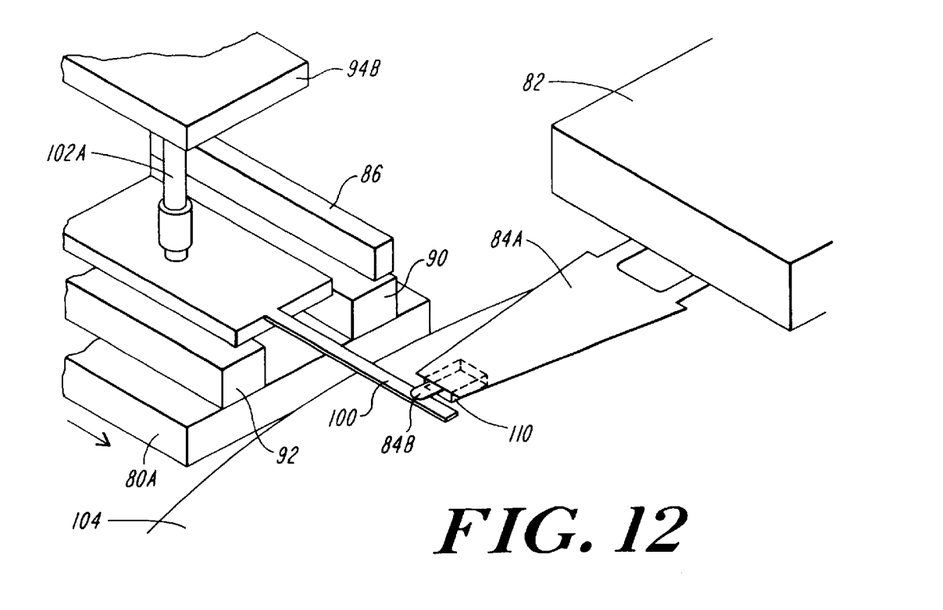
Figure 13:
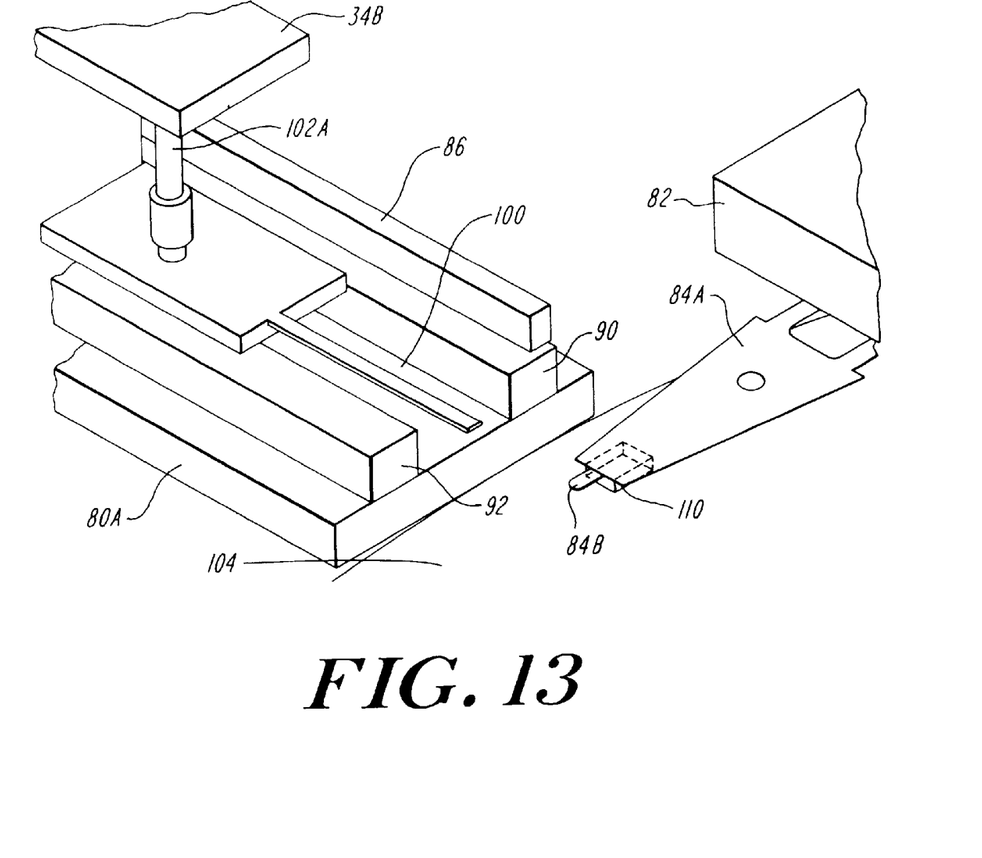

In steps, as shown in FIG. 8C and FIG. 10, after the cartridge 82 and attached head-gimbal assembly 84 are is installed on base plate 80B, actuator 96 extends lift arm 100 in the Y-axis direction to underlie tab 84B of head-gimbal assembly 84. In step 4, FIG. 8D, actuator 102 drives lift bar 100 to engage tab 84B and lift the head-gimbal assembly 84 off of protector bar 86. While in this embodiment, the lift arm 86 engages the suspension member 84A at lift tab 84B, in other embodiments (e.g., without such a lift tab), arm 100 may engage suspension member 84A at another point close to slider 110. Next, in Step 5, FIG. 8E and FIG. 11, actuator 88 retracts protector bar 86. In Step 6, FIG. 8F and FIG. 12, the head-loading mechanism 85 (by portions of the spin-stand which are not shown) is positioned over disk 104. In step 7, FIG. 8G, lift arm 100 is lowered (by actuator 102) until lift arm 100 disengages with tab 84B of the suspension member 84A and until the slide 110 reaches a position that the slider 10 together with its read and write elements "fly" over disk 104. At this time, a gap exists between disk 104 and lift arm 100. Actuator 96 then retracts lift arm 100 as shown in Step 8, FIG. 8H and FIG. 13, which completes the loading operation. Accordingly, head-gimbal assembly 84 is ready for testing. Although FIGS. 8G and 8H appear to show slider 110 in actual contact with disk 104, it will be understood that slider 110 is separated from disk 104 by the flying height, a very small physical distance.

Once testing is complete, head-gimbal assembly 84 can be unloaded from the disk. During the unloading operation, Steps 1–8 of FIGS. 8A–8H outlined above for the loading operation, are performed in reverse order. That is, actuator 96 first extends lift arm 100 such that it is disposed between disk 104 and the suspension member of head-gimbal assembly 84, but is in contact with neither. Actuator 102 then lifts lift arm 100 which in turn lifts head-gimbal assembly 84 away from disk 104. Next, the head-loading mechanism is positioned such that head-gimbal assembly 84 is outside the disk area and actuator 88 extends protector bar 86 such that it is under the suspension member 84A of head-gimbal assembly 84. Actuator 102 then lowers lift arm 100 which in turn lowers head-gimbal assembly 84 onto protector bar 86. Finally, actuator 96 retracts lift arm 100, which completes the unloading operation. Cartridge 82 and head-gimbal assembly 84 can then be replaced, if desired, with a different cartridge and head-gimbal assembly or disk 104 can be replaced, if desired. In either case, the same loading, testing and unloading sequence can be commenced.

Although the invention has been shown and described with reference to a specific preferred embodiment, it should be understood that the description of the preferred embodiment does not limit the field of application of the invention and that many modifications are possible within the limits of the appended claims. For example, lift arm 100 may contact the suspension member 84A of the head-gimbal assembly 84 at a different point, rather than at a lift tab at the end of the suspension member. In some cases, for instance, suspension member 84A may not include a lifting tab. Or, the lift arm 100 may have a wedge shaped end for engaging suspension member 84, instead of the squared off end described above. In this configuration, the vertical actuator for the lift arm 100 is not necessary. The inclined surface of the wedge effects the vertical motion necessary for loading and unloading. As another example, a different number or combination of actuators may be used for driving the protector and lift arms. In addition, different configurations for the head cartridge can be used, for example without discrete cartridge 82. Accordingly, the invention may be embodied in other specific forms without departing from the spirit or central characteristics thereof. The present embodiments are, therefore, to be considered in all respects as illustrative and not restrictive, the scope of the invention being indicated by the appending claims rather than by the foregoing description, and all changes that come within the meaning and range of equivalency of the claims are therefore intended to be embraced therein.

What is claimed is:

1. An apparatus for loading a slider of a cartridge/HGA assembly against a surface of a rotating magnetic disk, wherein said cartridge/HGA assembly includes (a) a cartridge having a suspension support surface on one side thereof, and (b) a head-gimbal assembly including (i) an elongated, resilient suspension member extending along a suspension axis from a proximal end to a distal end, said suspension member having a first side at said proximal end affixed to said suspension support surface of said cartridge, and (ii) a slider including read and write elements, said slider being affixed to a second side of said suspension member at a point along said suspension axis between said distal end and said proximal end, comprising:

A. a spindle and associated disk support assembly attached to a base and adapted for supporting said disk in a disk locus in a disk plane, and for rotating said disk in said disk locus about a spin axis perpendicular to said disk plane, B. a head loader assembly slidable in a predetermined range of motion along a slide axis parallel to said disk plane, and includes:
      (i) head support means for rigidly supporting said cartridge mounted thereon, whereby said read and write elements are opposite said disk plane and, at least in part of said range of motion of said head loader assembly, are opposite said disk locus, and said suspension axis is in a suspension plane perpendicular to said slide axis and is nominally inclined toward said disk plane, (ii) a lift arm in a first locus at least in part extending in a direction parallel to said slide axis and extending through said suspension plane, said lift arm being selectively moveable in the direction of said slide axis and in a direction of a lift axis perpendicular to said disk plane, wherein said first locus is between said cartridge and said distal end of said suspension member when said cartridge is mounted to said head support means, and, (iii) a protector bar in a second locus at least in part extending in a direction parallel to said slide axis and extending through said suspension plane, said protector bar being selectively movable in the direction of said slide axis and being at least a distance D1 from said head support means, where D1 is sufficient to ensure that said suspension member is deflected from said nominal inclination when said cartridge is supported by said head support means and said protector bar is in said suspension plane, wherein said second locus is between said first locus and said proximal end of said suspension member when said suspension member is mounted to said head support means, and (iv) a driver/controller operative prior to mounting of said cartridge to said head support means, to position said protector bar to extend through said suspension plane, whereby upon mounting said cartridge to said head support means, said suspension member is biased against a top surface of said protector bar, and operative following mounting said cartridge to said head support means to in succession:

(a) drive said lift arm in the direction of said slide axis to a position underlying said suspension member, (b) drive said lift arm in the direction of said lift axis until said lift arm engages said suspension member and lifts said suspension member from said top surface of said protector bar, (c) drive said protector bar in the direction of said slide axis so that said protector bar does not overlie said disk locus, (d) drive said head support means whereby said read and write elements overlie said disk locus, (e) drive said lift arm in the direction of said lift axis and toward said disk locus, until said suspension member disengages from said lift arm, and (f) drive said lift arm in the direction of said slide axis so that said lift arm does not overlie said disk locus.

2. An apparatus according to claim 1 wherein said top surface of said protector bar is a relatively low coefficient of friction material.

3. An apparatus for loading a slider having magnetic read and write elements on a magnetic disk which is spinning in a disk plane, said slider being disposed at a distal end of a resilient suspension member, where a proximal end of said suspension member is secured to a cartridge, comprising:

A. a base plate having a mounting surface for receiving said cartridge whereby said suspension member extends therefrom with a suspension axis being in a suspension plane and being inclined from said cartridge toward said disk plane, B. a protector bar slidingly coupled to said base plate along a first axis parallel to said disk plane, said protector bar being selectively movable in the direction of said first axis, when said cartridge is received on said mounting surface of said base plate, to underlie said suspension member when in an extended position, and to not underlie said suspension member when in a retracted position, said protector bar having an upper surface adapted to interferingly engage said suspension member when said cartridge is received on said mounting surface of said base plate, C. a lift arm slidingly coupled to said base plate along a second axis parallel to said disk plane and along a third axis perpendicular to said disk plane, said lift arm being selectively movable in the direction of said second axis when said cartridge is received on said mounting surface of said base plate, to underlie said suspension member in an extended position, and to not underlie said suspension member in a retracted position, and being selectively movable in the direction of said third axis between a first point and a second point, wherein said first point is between said suspension member and said disk plane when said cartridge is received on said mounting surface and said protector bar is in said extended position, and said second point is above said first point.

4. An apparatus according to claim 3 wherein said upper surface is made of a material having a relatively low coefficient of friction.

5. An apparatus according to claim 4 wherein said first axis and said second axis are parallel.

6. An apparatus according to claim 5 wherein said first axis is between said mounting surface of said base plate and said second axis.

* * * * *